UNITED STATES PATENT OFFICE.

HENRY PEMBERTON, OF ALLEGHENY CITY, PENNSYLVANIA.

IMPROVEMENT IN REFINING HYDROCARBON OILS AND UTILIZING WASTE PRODUCTS THEREFROM.

Specification forming part of Letters Patent No. 24,952, dated August 2, 1859; Reissue No. 2,431, dated January 1, 1867.

*To all whom it may concern:*

Be it known that I, HENRY PEMBERTON, of the city of Allegheny, county of Allegheny, and State of Pennsylvania, (formerly of East Tarentum, in said county and State,) have invented a new and useful Improvement in the Process of Refining Coal-Oils and Utilizing Waste Products therefrom; and I do hereby declare the following to be a full, clear, and exact description thereof.

My invention consists in the mode, hereinafter described, of treating the residuum left after the purification of the hydrocarburets obtained from the distillation of coals, petroleum, and other bituminous articles, for the purpose of recovering the sulphuric acid employed in the process of purification, which has not, so far as I know, been heretofore successfully accomplished. The products resulting from the destructive distillation of cannel-coal, bituminous coal, bituminous shale, petroleum or mineral naphtha, and other similar substances require to go through a process of purification in order to remove these substances which are susceptible of decomposition by or of combination with acid and alkali, and the presence of which would prove highly injurious. The process ordinarily employed in the purification of these liquid and solid hydrocarburets consists in separating by distillation those combinations which have less density and a lower boiling-point from those which are specifically heavier and less volatile, and, after being purified as far as practicable in this manner, subjecting them to the action of concentrated sulphuric acid and a strong solution of caustic alkali, in order to remove from the neutral oils all substances capable of being decomposed or of entering into combination with those reagents. The quantity of acid and alkali required to effect these changes varies considerably, and depends on the nature of the crude material originally employed; but in the aggregate it is a very large amount, averaging about twenty per cent., in weight, of acid and ten per cent. alkali of the oil under treatment. As the quantity of such oils now manufactured is very large and constantly increasing, and as the expense of these chemical agents used in their purification greatly enhances the cost, it becomes a matter of considerable importance to recover, if possible, a part, if not all, of the acid and alkali thus employed. No difficulty has been experienced in regaining the alkali, as its indestructible nature allows of its being subjected (either when pure or in combination with organic acids and other compounds) to a high degree of heat, which burns out and destroys the organic matter and merely converts the alkalies into carbonates, in which state they retain a large part of their commercial value, and may, if desired, be easily restored to their caustic state by treatment with lime in the usual way. It is different, however, with the sulphuric acid after it has acted on the coal-oils, for the exposure of the acid to a sufficiently high heat to destroy the matters then found in combination therewith will decompose the acid itself, the tarry matters and organic acid present in the residuum which contains the sulphuric acid causing it (the acid) to yield oxygen to them, and itself undergoing decomposition, forming sulphurous acid and a mixture of carbonic acid, carbonic oxide, and volatile pyroligneous matters, which prevent the employment of the sulphurous acid in the acid-chambers for the reformation of sulphuric acid, and almost, if not entirely, destroy its usefulness for any purpose whatever. The fact of this union of organic bases with the sulphuric acid, and the appearance of the mixture, which in its partial transparency and uniform consistency exactly resembles a definite combination, has seemed to preclude any method of separating the acid from the tar. I have discovered, however, that this decomposition can be effected by exposing the "residuum" (which is a compound of acid and tarry matters) to the combined action of water and heat, whereby under the influence of the high temperature the attraction of the tarry matters for the acid is overcome by the superior affinity of the acid for the water, so that the acid separates itself from the tarry matter and dissolves in the water, from which it may be obtained in a concentrated state and purified by various means. This separation of the sulphuric acid from the tarry residuum of the purification of coal-oil and other hydrocarburets constitutes my invention; and to enable others skilled in the art to make practical use thereof, I will proceed to describe more in detail the manner in which I carry it into effect.

The residuum resulting from the hydrocarburets known as "coal-oils," consisting of a mixture of tarry matters and acid, may be first subjected to a low heat, not above 212° Fahrenheit, (the boiling-point of water,) in a suitable vessel, which renders it mere fluid and allows any oil it may yet contain to separate from it, which, as the mixture is then left to cool, will arise to the surface and may be readily decanted, leaving the residuum, when cold, of the consistence of thick wood tar. This tarry residuum is then placed in a vessel made of lead or other material suitable to resist the action of the acid, and of any convenient shape, of about equal depth and diameter, and to it a sufficient quantity of water is added in the same vessel. A pipe is inserted into the vessel, so as to be immersed in the residuum and water contained therein, that portion of the pipe which is so immersed being perforated with a number of small holes, through which steam introduced into the pipe escapes, causing a violent ebulition and agitation of the tarry mixture and water, which ebulition and agitation are kept up for a sufficient length of time to bring all the particles of the tarry residuum under treatment in contact with the hot water, and thus cause the sulphuric acid to unite therewith. This process of agitation, in connection with heat and moisture, must be continued for a longer or shorter time, varying from one to ten hours, or even longer, according to the capacity of the vessel and the quantity of tarry matter under treatment, and the process may be accelerated by the mechanical agitation of the contents of the vessel, so as to expose the tarry mixture more thoroughly to the action of the heat and moisture. When the tarry mass is by this process deprived of the acid, it will be found, in the case of oils produced from the distillation of coal and shales, to be completely altered in its properties. Instead of being, as at first, a semi-fluid and transparent in thin layers, it has become much more dense, even at the high temperature given to it by the steam, and when allowed to cool will become a hard resinous and opaque black mass, readily reducible to powder, and totally deprived of any acid taste, while in the case of petroleums the tar separates as an oily fluid, although portions of it (particularly on the continued action of heat) separate therefrom in tough resinous masses, resembling the hard resinous substance before mentioned. The aqueous solution of sulphuric acid thus procured is of a brown or yellow coler, varying with the different oils from which the residuum was obtained, and of a density depending on the amount of water used in the process, and proves to be nearly pure dilute sulphuric acid, contaminated, however, with small portions of organic matter in solution. The dilute acid thus obtained may be employed, without further purification or concentration, for many purposes, and by evaporation in leaden pans to the density of about 1.45 it is strong enough to be used for the decomposition of common salt in the production of sulphate of soda as a step in the manufacture of soda-ash. By pushing the concentration of the dilute sulphuric acid to 1.70, (which is as far as it is safe to carry the process in leaden vessels,) the acid obtained by my process becomes dark-colored and oqaque, evolving a little sulphurous acid. By diluting it now with water, a small quantity of carbonaceous matter separates, leaving the acid much lighter in color. It is then again concentrated, and again slightly diluted with water, and thus becomes a light brown color, and after again concentrating the acid and diluting with water until the color is sufficiently removed, a little purified animal charcoal or nitric acid is added, when the sulphuric acid is obtained sufficiently pure to permit of its being still further condensed in platinum until it is strong enough to be again used, as at first, in the purification of coal-oils. As the quantity of organic matter remaining in the acid, after it has been concentrated, as before stated, to about 1.45, or from that density to 1.70, is so inconsiderable as to be no disadvantage in the use of the acid for most purposes, it may be better, in a pecuniary point of view, to carry the process of concentration no further than can be done in leaden vessels. The process I have described may be varied, if desired, by dispensing with the introduction of steam or of applying heat outside of the vessel containing the tarry mass, as the heat evolved by the mixture of the acid and water will in many cases suffice for the separation of the acid from the tarry or carbonaceous residuum, thus securing the effect of heat and moisture; but the plan I have described is, in my judgment, the most desirable and efficient, as the introduction of steam effects the triple purpose of heat, moisture, and mechanical agitation, and dispenses with the necessity of agitating the residuum and water by means of machinery.

Having thus described my improvement, what I claim as my invention, and desire to secure by Letters Patent, is—

1. Recovering the sulphuric acid contained in the residuum of the process of refining coal-oil, petroleum, and other hydrocarburets by exposing the residuum (which is a compound of acid and tarry matters) to the combined action of water and heat, whereby under the influence of the high temperature the attraction of the tarry matters for the acid is overcome by the superior affinity of the acid for the water, so that the acid separates itself from the tarry matter and dissolves in the water, from which it may be obtained in a concentrated state and purified by various means, substantially as hereinbefore described.

2. Purifying the dilute sulphuric acid recovered from the residuum which results from the refining of coal-oils, petroleum, and other hydrocarburets by repeated processes of concentration and dilution with water, whereby the coloring-matter is separated and may be removed, substantially as hereinbefore described.

3. The use of the sulphuric acid recovered from the residuum resulting from the refining of coal-oil, petroleum, and other hydrocarburets for the decomposition of salt in the production of sulphate of soda as a step in the manufacture of soda-ash.

In testimony whereof I, the said HENRY PEMBERTON, have hereunto set my hand.

H. PEMBERTON.

Witnesses:

A. S. NICHOLSON,

GEORGE H. CHRISTY.